US010132240B2

(12) United States Patent
Ramier et al.

(10) Patent No.: US 10,132,240 B2
(45) Date of Patent: Nov. 20, 2018

(54) MULTI-FUNCTIONAL FUEL NOZZLE WITH A DUAL-ORIFICE ATOMIZER

(71) Applicant: SIEMENS AKTIENGESELLSCHAFT, München (DE)

(72) Inventors: Stephen A. Ramier, Fredericton (CA); Vinayak V. Barve, Oviedo, FL (US); Richard L. Thackway, Oviedo, FL (US); Charalambos Polyzopoulos, Orlando, FL (US); Khalil Farid Abou-Jaoude, Winter Springs, FL (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 24 days.

(21) Appl. No.: 15/328,228

(22) PCT Filed: Aug. 14, 2014

(86) PCT No.: PCT/US2014/051065
§ 371 (c)(1),
(2) Date: Jan. 23, 2017

(87) PCT Pub. No.: WO2016/024976
PCT Pub. Date: Feb. 18, 2016

(65) Prior Publication Data
US 2017/0204785 A1    Jul. 20, 2017

(51) Int. Cl.
*F23R 3/36* (2006.01)
*F02C 3/30* (2006.01)
(Continued)

(52) U.S. Cl.
CPC .................. *F02C 3/30* (2013.01); *F02C 7/22* (2013.01); *F23R 3/36* (2013.01);
(Continued)

(58) Field of Classification Search
CPC .. F23R 3/346; F23R 3/36; F23R 3/286; F23R 3/34; F23R 3/343; F23K 5/002;
(Continued)

(56) References Cited

U.S. PATENT DOCUMENTS 2,884,758 A    5/1959    Oberle
3,013,732 A    12/1961    Webster et al.
(Continued)

FOREIGN PATENT DOCUMENTS

CN    1211703 A    3/1999
CN    103953469 A    7/2014
(Continued)

OTHER PUBLICATIONS

PCT International Search Report and Written Opinion dated Apr. 24, 2015 corresponding to PCT Application No. PCT/US2014/051065 filed Aug. 14, 2014.

*Primary Examiner* — William H Rodriguez (57) ABSTRACT

A multi-functional fuel nozzle (10) for a combustion turbine engine is provided. An annular fuel-injecting lance (12) may include a first fluid circuit (14) and a second fluid circuit (16). One of the first and second fluid circuits during a liquid fuel operating mode of the combustion turbine engine may convey a liquid fuel. The other of the first and second fluid circuits may convey a selectable non-fuel fluid. An atomizer (30) is disposed at the downstream end of the lance. The atomizer may have a first ejection orifice (32) responsive to the first fluid circuit to form a first atomized ejection cone (34), and a second ejection orifice (36) responsive to the second fluid circuit to form a second atomized ejection cone (38). The first and second ejection cones (34, 38) formed with the atomizer may be concentric cones that intersect with one another over a predefined angular range.

18 Claims, 7 Drawing Sheets

(51) Int. Cl.
*F02C 7/22* (2006.01)
*F23R 3/28* (2006.01)

(52) U.S. Cl.
CPC ............... *F23C 2900/07021* (2013.01); *F23D 2204/10* (2013.01); *F23R 3/286* (2013.01)

(58) Field of Classification Search
CPC .... F23K 5/02; F23D 2202/00; F23D 2203/00; F23D 2204/10; F23N 2039/04; F23N 2039/06; F23C 2900/07021; F02C 3/30; F02C 7/22
See application file for complete search history.

(56) References Cited

U.S. PATENT DOCUMENTS

| | | | |
|---|---|---|---|
| 3,777,983 A | 12/1973 | Hibbins | |
| 4,311,277 A | 1/1982 | Stratton | |
| 4,842,509 A | 6/1989 | Hasenack | |
| 5,361,578 A | 11/1994 | Donlan | |
| 5,423,173 A | 6/1995 | Lemon et al. | |
| 5,826,798 A * | 10/1998 | Schindler | F23D 11/383 239/403 |
| 5,873,237 A | 2/1999 | Media et al. | |
| 6,021,635 A | 2/2000 | Gaag et al. | |
| 6,024,301 A * | 2/2000 | Hurley | B05B 1/3436 239/463 |
| 6,068,470 A | 5/2000 | Zarzalis et al. | |
| 6,402,059 B1 | 6/2002 | Benz et al. | |
| 6,547,163 B1 | 4/2003 | Mansour et al. | |
| 6,622,944 B1 * | 9/2003 | Hurley | F23D 11/102 239/426 |
| 6,814,307 B2 * | 11/2004 | Hurley | B05B 1/3484 239/463 |
| 7,200,997 B2 | 4/2007 | Carlson, Jr. et al. | |
| 7,509,809 B2 | 3/2009 | Patel et al. | |
| 7,963,764 B2 | 6/2011 | Brautsch et al. | |
| 8,146,365 B2 * | 4/2012 | Shum | F23D 11/108 60/740 |
| 8,220,269 B2 | 7/2012 | Poyyapakkam | |
| 8,726,668 B2 | 5/2014 | Patel et al. | |
| 9,958,152 B2 * | 5/2018 | Ramier | F23C 1/08 |
| 2005/0039456 A1 * | 2/2005 | Hayashi | F23D 11/107 60/737 |
| 2007/0006587 A1 * | 1/2007 | Ohta | F23R 3/286 60/746 |
| 2010/0263382 A1 | 10/2010 | Mancini et al. | |
| 2011/0031333 A1 | 2/2011 | Short | |
| 2011/0314831 A1 | 12/2011 | Abou-Jaoude et al. | |
| 2013/0031907 A1 | 2/2013 | Woerz et al. | |
| 2013/0036740 A1 | 2/2013 | Woerz et al. | |
| 2016/0348911 A1 * | 12/2016 | Polyzopoulos | F01D 9/023 |

FOREIGN PATENT DOCUMENTS

| | | |
|---|---|---|
| GB | 1530260 A | 10/1978 |
| JP | 2000039148 A | 2/2000 |
| JP | 2002156115 A | 5/2002 |

* cited by examiner

MULTI-FUNCTIONAL FUEL NOZZLE WITH A DUAL-ORIFICE ATOMIZER

BACKGROUND

1. Field

Disclosed embodiments relate to a fuel nozzle for a combustion turbine engine, such as a gas turbine engine. More particularly, disclosed embodiments relate to an improved multi-functional fuel nozzle with a dual-orifice atomizer configured to form intersecting atomized spray cones.

2. Description of the Related Art

Gas turbine engines include one or more combustors configured to produce a hot working gas by burning a fuel in compressed air. A fuel injecting assembly or nozzle is employed to introduce fuel into each combustor. To provide flexibility to the user, such fuel nozzles may be of a multi-fuel type that are capable of burning either a liquid or a gaseous fuel, or both simultaneously.

Combustion in gas turbine combustors results in the formation of oxides of nitrogen (NOx) in the combusted gas, which is considered undesirable. One technique for reducing the formation of NOx involves injecting water, via the fuel injecting nozzle, into the combustor along with the fuel. U.S. patent application Ser. No. 13/163,826 discloses a fuel nozzle assembly capable of burning either gaseous or liquid fuel, or both, along with liquid water injection.

DETAILED DESCRIPTION

The inventors of the present invention have recognized some issues that can arise in the context of certain prior art multi-fuel nozzles. For example, to reduce NOx emissions, these multi-fuel nozzles are known to inject water into a combustor basket. This injection is typically in the form of non-atomized (e.g., solid) water jets or streams that can impinge on inner wall liners in the basket, and, consequently, these water jets or streams can impose substantial thermal distress on the liner walls and eventually lead to a shortened life of such liner walls.

At least in view of such recognition, the present inventors propose an innovative multi-functional fuel nozzle that cost-effectively and reliably is effective for injecting water in the form of a cone of finely atomized water. The atomized cone may be configured to reduce NOx emissions while reducing water consumption and meeting pertinent combustion performance requirements, such as may involve combustion dynamics, liner wall temperatures, etc. The proposed fuel nozzle can provide enhanced operational versatility through a multiple operational functionality. This multiple operational functionality can be optionally interchanged depending on the needs of a given application. Further aspects of the proposed multi-functional fuel nozzle will be discussed in the disclosure below.

Figure 1:
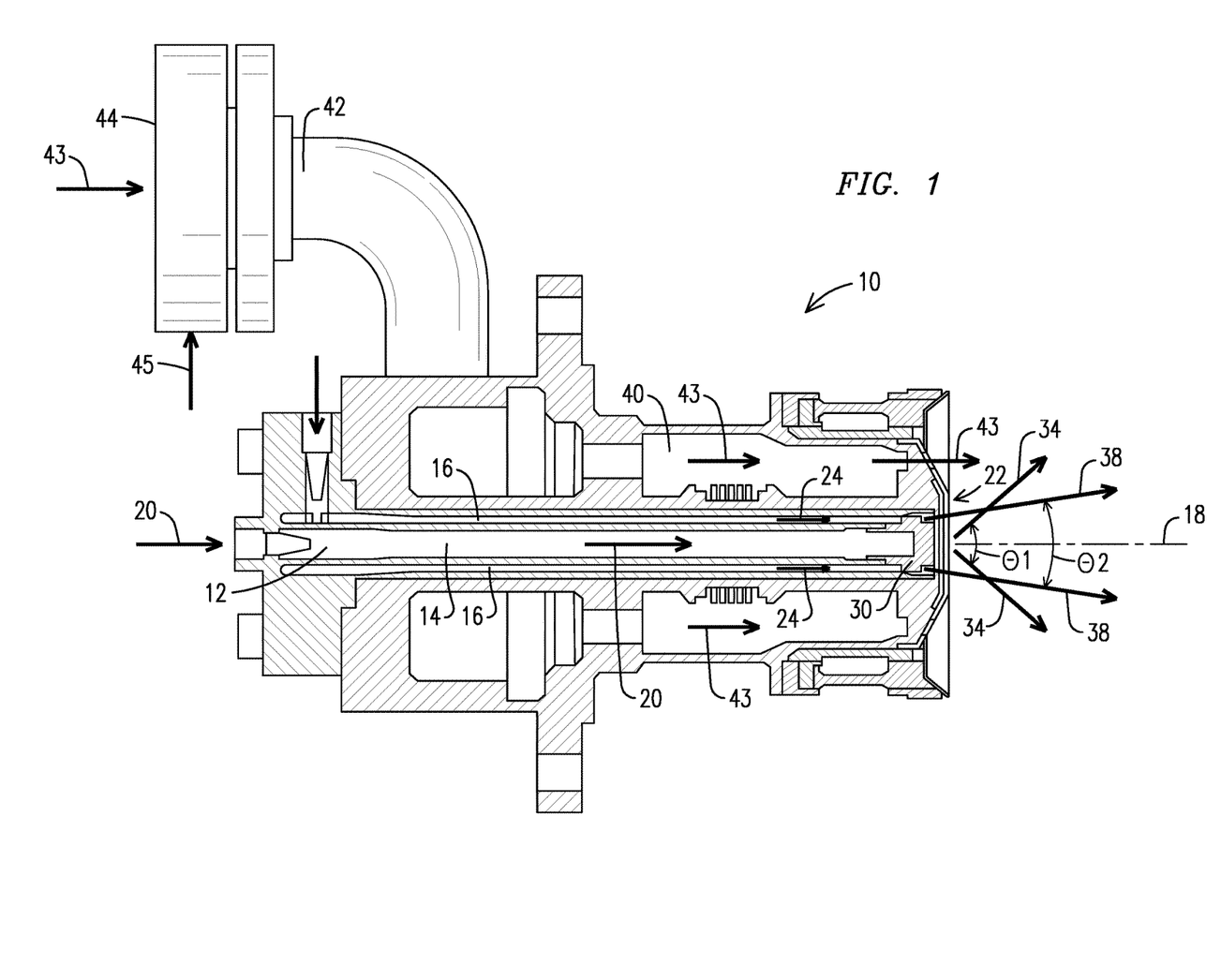
FIG. 1 is a cutaway, side view of one non-limiting embodiment of a multi-functional fuel nozzle embodying aspects of the present invention.

FIG. 1 is a cutaway, side view of one non-limiting embodiment of a multi-functional fuel nozzle 10 embodying aspects of the present invention. In this embodiment, multi-functional fuel nozzle 10 includes an annular fuel-injecting lance 12 including a first fluid circuit 14 and a second fluid circuit 16. First fluid circuit 14 is centrally disposed within fuel-injecting lance 12. First fluid circuit 14 extends along a longitudinal axis 18 of lance 12 to convey a first fluid (schematically represented by arrows 20) to a downstream end 22 of lance 12.

Figures 3, 4:
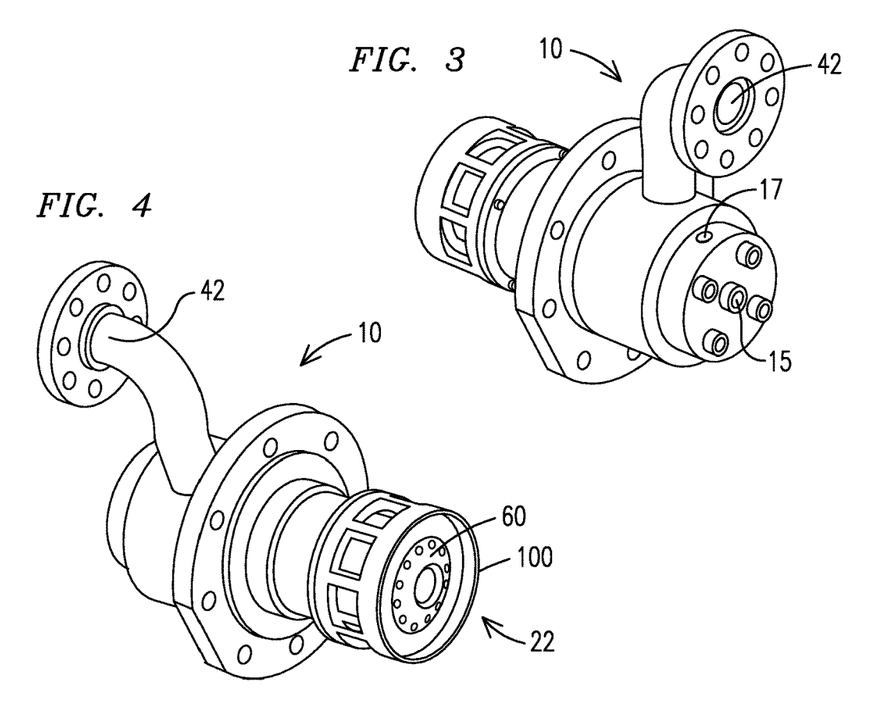
FIG. 3 is a rearwardly, isometric view of the multi-functional fuel nozzle shown in FIG. 1.
FIG. 4 is a forwardly, isometric view of the multi-functional fuel nozzle shown in FIG. 1.

Second fluid circuit 16 is annularly disposed about first fluid circuit 14 to convey a second fluid (schematically represented by arrows 24) to downstream end 22 of lance 12. As may be appreciated in FIG. 3, a centrally disposed first inlet 15 may be used to introduce first fluid 20 into first fluid circuit 14. Similarly, a second inlet 17 may be used to introduce second fluid 24 into second fluid circuit 16.

As will be discussed in greater detail below, in one non-limiting embodiment one of the first or second fluids 20, 24 may comprise a liquid fuel, such as an oil distillate, conveyed by one of the first and second fluid circuits 14, 16 during a liquid fuel operating mode of the combustion turbine engine. The other of the first and second fluids 20, 24, conveyed by the other of first and second fluid circuits 14, 16, may comprise a selectable non-fuel fluid, such as air or water.

An atomizer 30 is disposed at downstream end 22 of lance 12. As may be appreciated in FIG. 2, in one non-limiting embodiment, atomizer 30 includes a first ejection orifice 32 responsive to first fluid circuit 14 to form a first atomized ejection cone (schematically represented by lines 34 (FIG. 1). Atomizer 30 further includes a second ejection orifice 36 responsive to second fluid circuit 16 to form a second atomized ejection cone (schematically represented by lines 38 (FIG. 2)). Thus, it will be appreciated that in this embodiment, atomizer 30 comprises a dual orifice atomizer.

Figure 2:
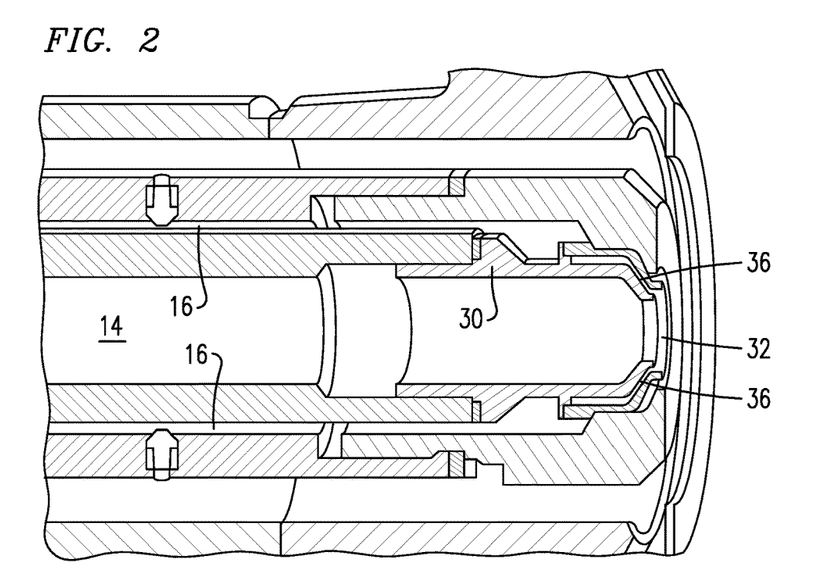
FIG. 2 is an isometric, fragmentary cutaway view illustrating details of one non-limiting example of an atomizer disposed at a downstream end of a multi-functional fuel nozzle embodying aspects of the present invention.

In one non-limiting embodiment, orifices 32, 36 of atomizer 30 are respectively configured so that the first and second ejection cones 34, 38 formed with atomizer 30 comprise concentric patterns, such as cones that intersect with one another over a predefined angular range. Without limitation, such patterns may comprise solid cones, semi-solid cones, hollow cones, fine spray cones, sheets of air, or individual droplets (spray).

In one non-limiting embodiment, an angular range ($\theta 1$, (FIG. 1)) of first atomized ejection cone 34 extends from approximately 80 degrees to approximately 120 degrees. In a further non-limiting embodiment, the angular range $\theta 1$ of first atomized ejection cone 34 extends from approximately 90 degrees to approximately 115 degrees. In still a further non-limiting embodiment, the angular range $\theta 1$ of first atomized ejection cone 34 extends from approximately 104 degrees to approximately 110 degrees.

In one non-limiting embodiment, an angular range ($\theta 2$) of second atomized ejection cone 38 extends from approximately 40 degrees to approximately 90 degrees. In a further non-limiting embodiment, the angular range $\theta 2$ of second atomized ejection cone 38 extends from approximately 60 degrees to approximately 80 degrees.

It is believed that relatively larger angular differences between first and second atomized ejection cones 34, 38 tend to provide enhanced atomization during an ignition event of the liquid fuel. Conversely, relatively smaller angular differences between first and second atomized ejection cones 34, 38 tend to provide enhanced NOx reduction capability during gas fuel operation. For example, in a non-limiting combination where the angular range $\theta 1$ of first atomized ejection cone 34 is approximately 110 degrees and the angular range $\theta 2$ of second atomized ejection cone 38 is approximately 40 degrees would likely provide enhanced atomization during the ignition event of the liquid fuel compared to, for example, another non-limiting combination where the angular range $\theta 1$ of first atomized ejection cone 34 is approximately 110 degrees and the angular range $\theta 2$ of second atomized ejection cone 38 is approximately 80 degrees. As noted above, the latter example combination would likely provide enhanced NOx reduction capability during gas fuel operation. Broadly, the predefined angular range of intersection of the first and second atomized cones may be tailored to optimize a desired operational characteristic of the engine, such as atomization performance during an ignition event of the liquid fuel, Nox abatement performance, etc.

In accordance with aspects of disclosed embodiments, the operational functionality respectively provided by first and second fluid circuits 14, 16 and the first and second ejection cones 34, 38 formed by atomizer 30 may be optionally interchanged based on the needs of a given application. That is, the type of fluids respectively conveyed by first and second fluid circuits 14, 16 may be optionally interchanged based on the needs of a given application.

For example, in one non-limiting embodiment, during an ignition event of the liquid fuel, the selectable non-fuel fluid may comprise air, which in one example case is conveyed by first fluid circuit 14, and, in this case, the first atomized ejection cone 38 comprises a cone of air, and the liquid fuel comprises an oil fuel, which is conveyed by second fluid circuit 16, and, in this case, the second atomized ejection cone 34 comprises a cone of atomized oil fuel. In this embodiment, subsequent to the ignition event of the liquid fuel, the selectable non-fuel fluid comprises water (in lieu of air), which is conveyed by first fluid circuit 14, and the first atomized ejection cone 34 comprises a cone of atomized water.

In one alternative non-limiting embodiment, during the ignition event of the liquid fuel—which in this alternative embodiment is conveyed by first circuit 14 in lieu of second circuit 16—and, thus in this case, the first atomized ejection cone 34 comprises a cone of atomized oil fuel, and the selectable non-fuel fluid comprises air, which in this case is conveyed by second circuit 16 in lieu of first circuit 14, and, thus the second atomized ejection cone 38 comprises a cone of air. Subsequent to the ignition event of the liquid fuel, the selectable non-fuel fluid comprises water (in lieu of air), which in this alternative embodiment is conveyed by second fluid circuit 16, and thus second atomized ejection cone 38 comprises a cone formed of atomized water.

In one non-limiting embodiment, a plurality of gas fuel channels 40 is circumferentially disposed about the longitudinal axis 18 of fuel lance 12. Gas fuel channels 40 are positioned circumferentially outwardly relative to fuel lance 12. A gas inlet 42 may be used to introduce gas fuel (schematically represented by arrows 43) into gas fuel channels 40. In one non-limiting embodiment, during a gas fuel operating mode of the engine, the selectable non-fuel fluid comprises water, which is conveyed by at least one of the first and second fluid circuits 14, 16, and thus at least one of the first and second ejection cones 38, 34 comprises a respective cone formed of atomized water. Optionally, during the gas fuel operating mode of the engine, the plurality of gas fuel channels 40 may be configured to convey water mixed with fuel gas alone or in combination with at least one of the first and second fluid circuits 14, 16. In one non-limiting embodiment, water (schematically represented by arrow 45) may be introduced into the plurality of gas fuel channels 40 by way of a doughnut-shaped inlet 44 (FIG. 1).

Figure 5:
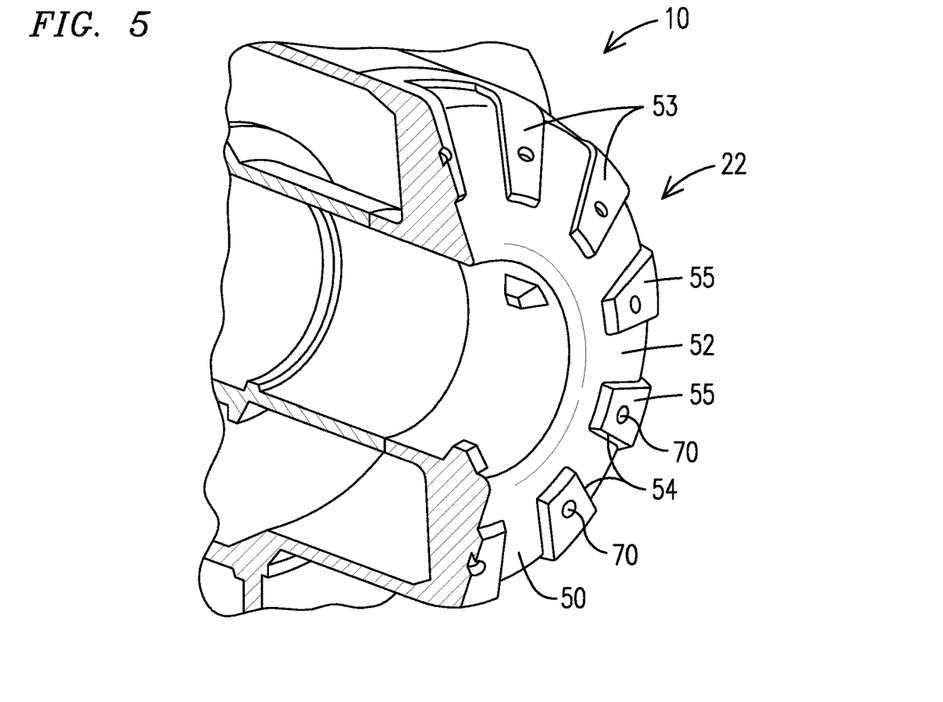
FIG. 5 is an isometric, fragmentary cutaway view illustrating details of one non-limiting example of a nozzle cap disposed at the downstream end of a multi-functional fuel nozzle embodying aspects of the present invention.
Figure 6:
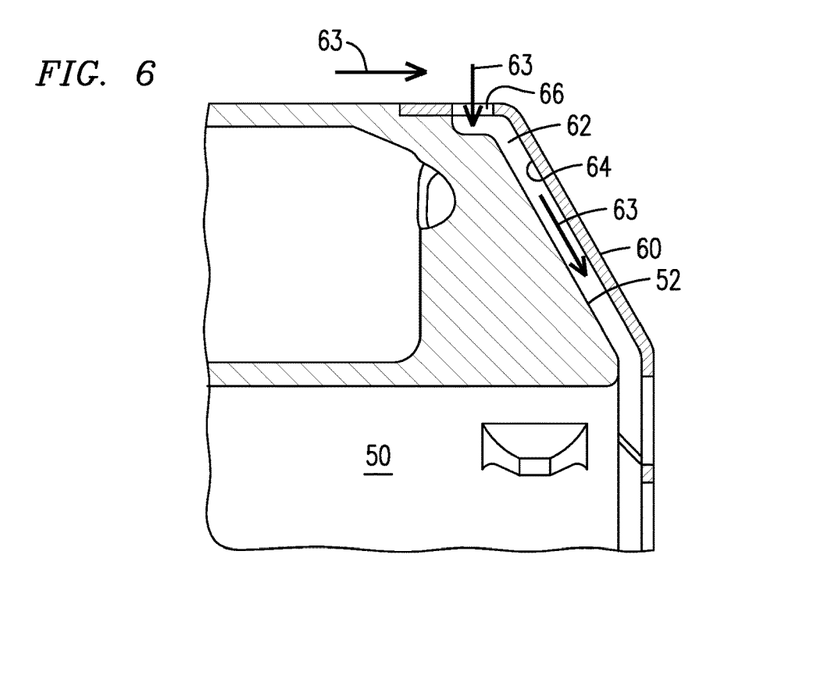
FIG. 6 is a fragmentary side view of the nozzle cap shown in FIG. 5 and a heat shield mounted on a forward face of the nozzle cap.
Figure 7:
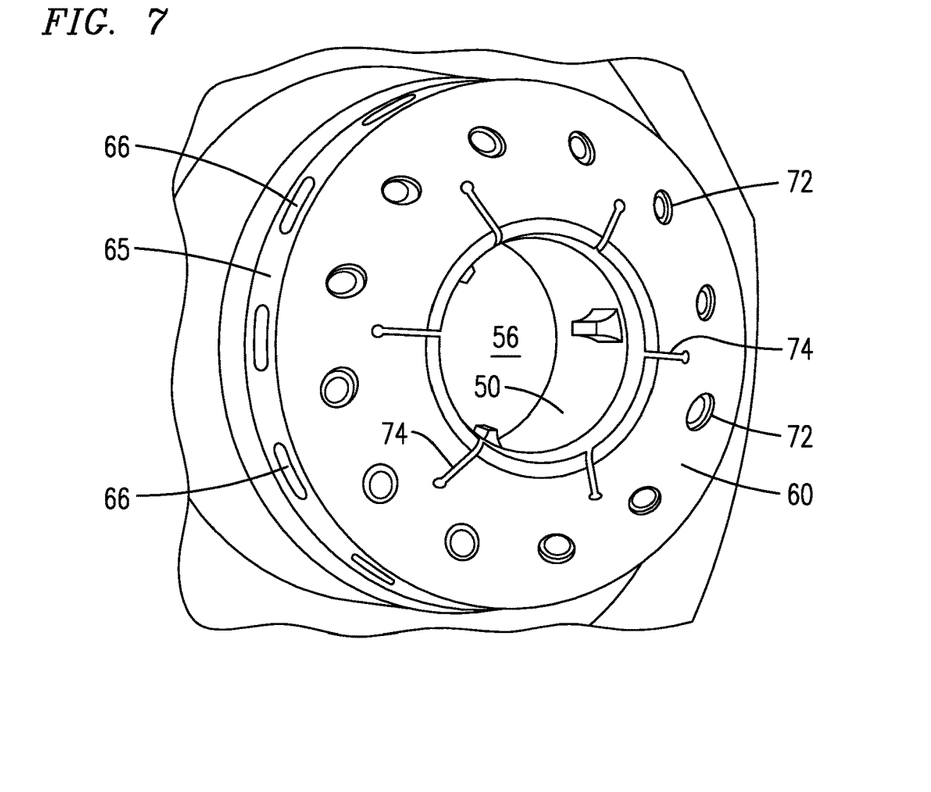
FIG. 7 is a forwardly isometric view illustrating the heat shield and further illustrating a centrally-disposed bore in the nozzle cap.

FIG. 5 is an isometric, fragmentary cutaway view illustrating details of one non-limiting embodiment of a nozzle cap 50 disposed at downstream end 22 of multi-fuel nozzle 10. As may be appreciated in FIGS. 6 and 7, a heat shield 60 is mounted onto nozzle cap 50. A plurality of cooling channels 62 (for simplicity of illustration just one cooling channel is shown in FIG. 6 for conveying a cooling medium, such as air (schematically represented by arrows 63 (FIG. 6)), is arranged between a forward face 52 of nozzle cap and a corresponding back side 64 of the heat shield.

In one non-limiting embodiment, nozzle cap 50 includes a plurality of castellations 53 (FIG. 5) circumferentially arranged on forward face 52 of nozzle cap 50. Mutually facing lateral surfaces 54 of adjacent castellations define respective recesses on forward face 52 of nozzle cap 50. First portions of back side 64 of heat shield 60 abut against respective top surfaces 55 of castellations 53 on forward face 52 of nozzle cap 50. Second portions of back side 64 of heat shield 60 (the portions that do not abut against the respective top surfaces 55 of castellations 53 are arranged to close corresponding top areas of the recesses on forward face 52 of nozzle cap 50 to form the plurality of cooling channels 62.

Figure 9:
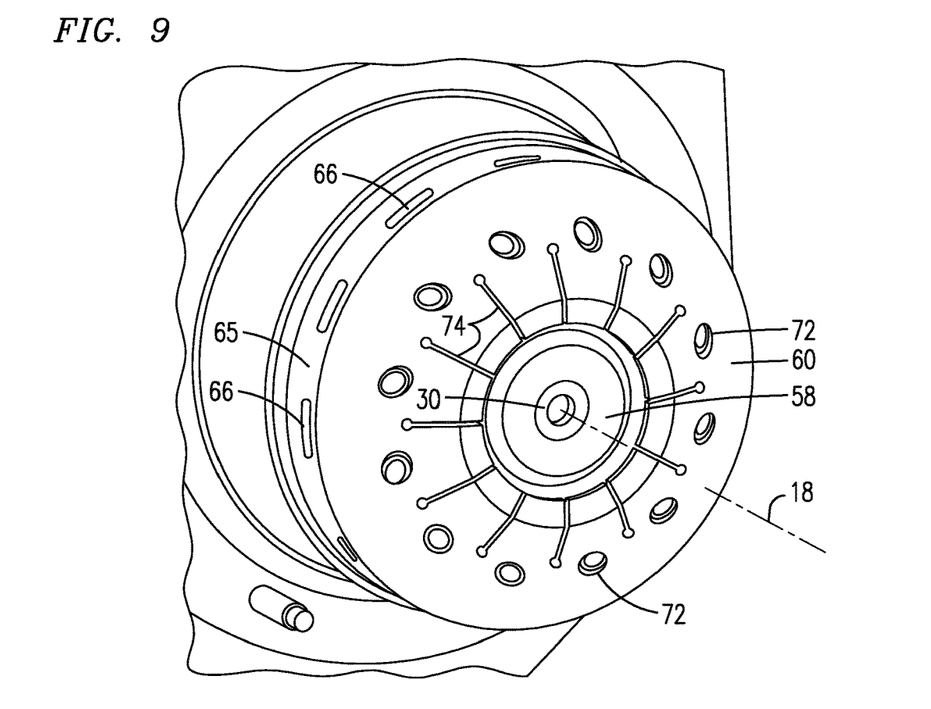
FIG. 9 is forwardly isometric view illustrating the heat shield and further illustrating one non-limiting example of an atomizer assembly installed in the bore of the nozzle cap.

In one non-limiting embodiment, heat shield 60 comprises an annular lip 65 (FIGS. 7, 9) including a plurality of slots 66 circumferentially disposed about longitudinal axis 18 of nozzle 10. Slots 66 are positioned to feed cooling air to cooling channels 62. Nozzle cap 50 comprises a centrally located bore 56 (FIG. 7) arranged to accommodate a downstream portion of fuel lance 12 of nozzle 10. Downstream portion of fuel lance 12 includes an atomizer assembly 58 (FIG. 9), such as may include atomizer 30.

In one non-limiting embodiment, cooling channels 62 are arranged to convey the cooling medium in a direction towards the centrally located bore 56 to discharge the cooling medium over a forward face of atomizer assembly 58.

Figure 8:
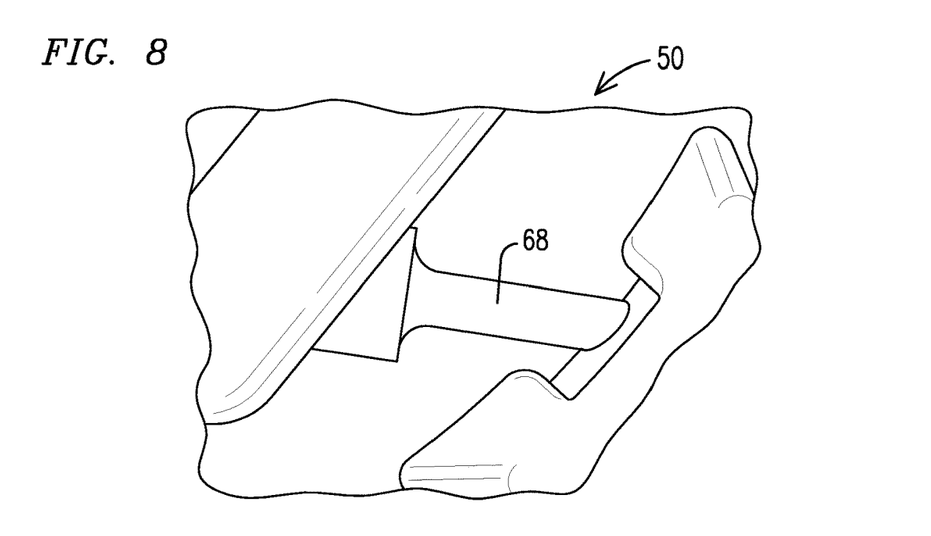
FIG. 8 is schematic representation of a gas fuel channel in the nozzle cap.

Nozzle cap 50 further comprises a plurality of gas fuel channels 68 (FIG. 8) circumferentially disposed about longitudinal axis 18 of nozzle 10. Gas fuel channels 68 comprise outlets 70 (FIG. 5) arranged at respective top surfaces 55 of castellations 53. Heat shield 60 similarly comprises a plurality of openings 72 in correspondence with the outlets 70 arranged at the respective top surfaces of the castellations.

In one non-limiting embodiment, heat shield 60 comprises a plurality of slits 74 radially extending a predefined distance from an inner diameter of heat shield 60. Slits 74 may be interposed between at least some adjacent pairs of the plurality of openings 72 in heat shield 60. As will be appreciated by those skilled in the art, slits 74 provide stress relief functionality to heat shield 60.

Figure 10:
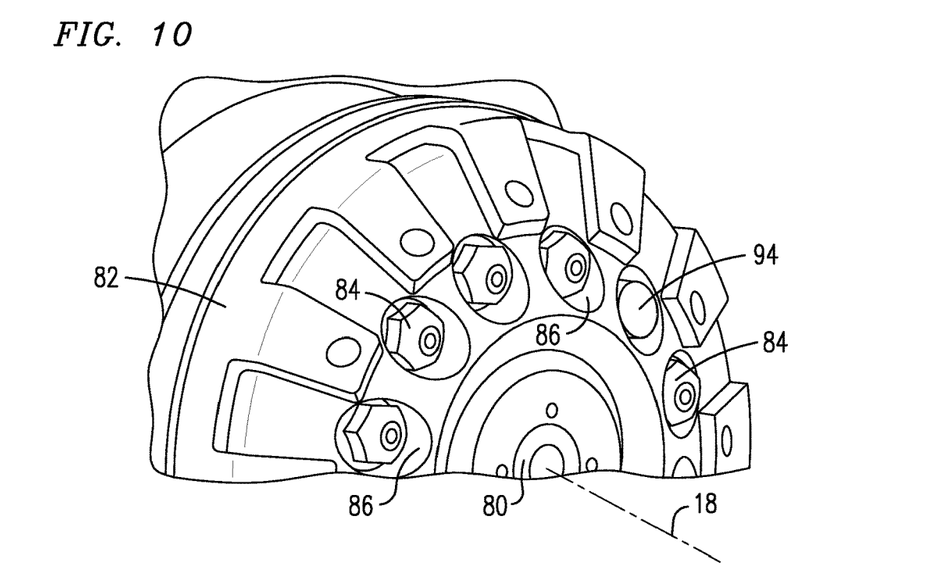
FIG. 10 is a forwardly, fragmentary isometric view illustrating details of another non-limiting example of a nozzle cap including an annular array of atomizers disposed at the downstream end of a multi-functional fuel nozzle embodying further aspects of the present invention.
Figure 11:
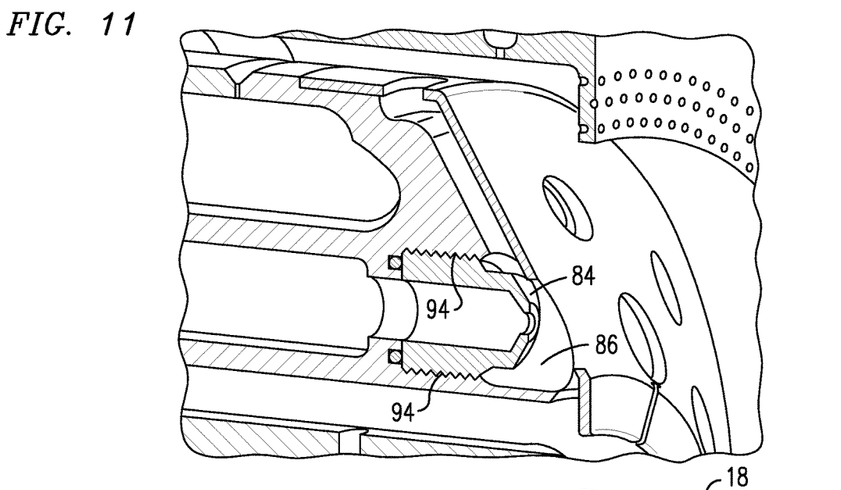
FIG. 11 is a cutaway, fragmentary isometric view illustrating details of one atomizer in the array of atomizers.
Figure 12:
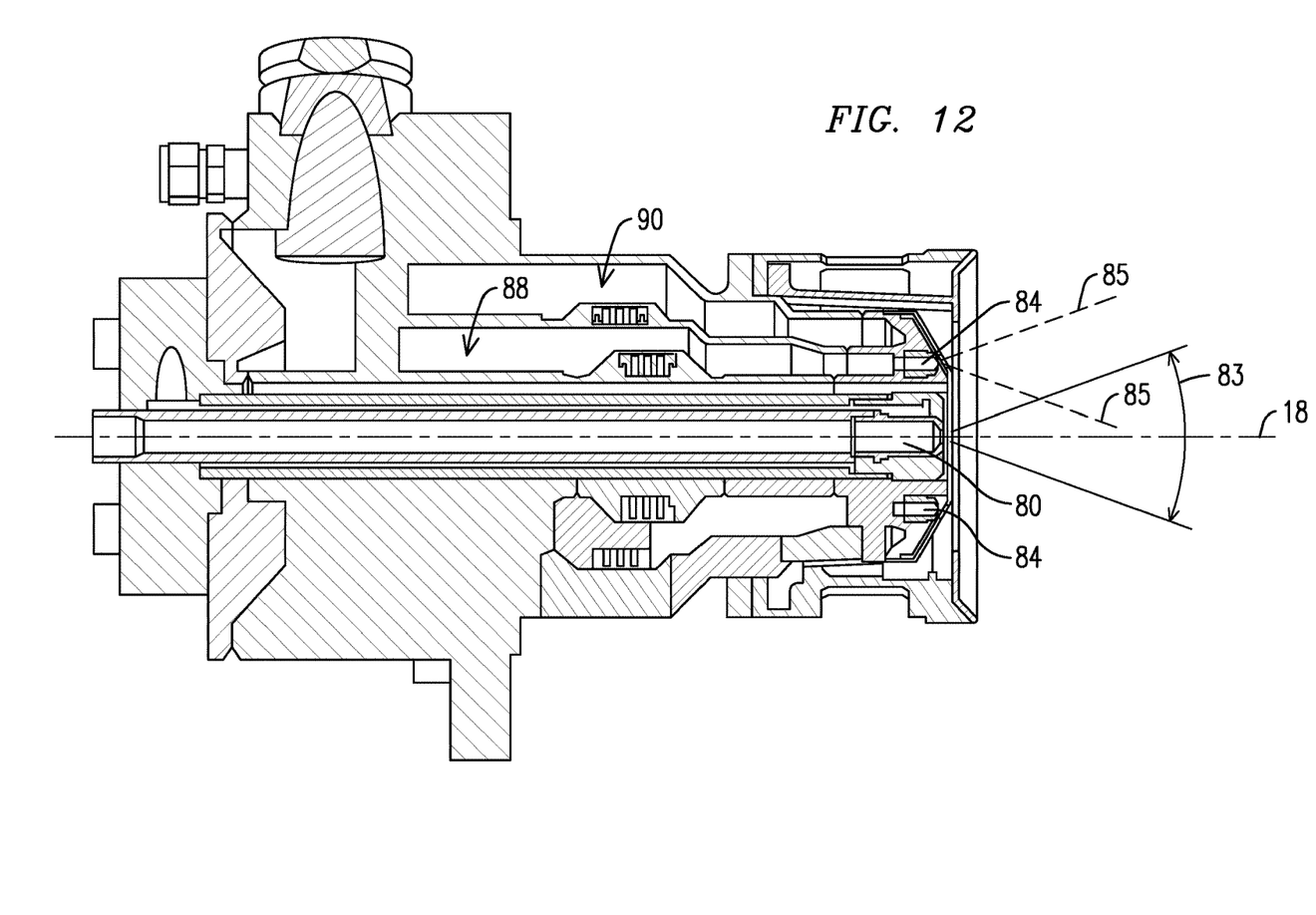
FIG. 12 is a cutaway, side view of one non-limiting embodiment of a multi-functional fuel nozzle embodying the annular array of atomizers.

As illustrated in FIGS. 10-12, in one non-limiting embodiment, a centrally-located atomizer 80 (e.g., a single orifice atomizer) may be disposed in the centrally located bore of a nozzle cap 82 to form a first atomized ejection cone, schematically represented by lines 83 (FIG. 12). In this embodiment, an array of atomizers 84 may be installed in nozzle cap 82 to form an array of respective second atomized ejection cones (one cone in the array is schematically represented by lines 85 (FIG. 12)). Atomizer array 84 may be circumferentially disposed about longitudinal axis 18 of the lance. Atomizer array 84 may be positioned radially outwardly relative to centrally-located atomizer 80 to form an array of respective second atomized ejection cones. In one non-limiting embodiment, atomizer array 84 comprises an annular array and nozzle cap 82 comprises an annular array of atomizer outlets 86 disposed on a forward face of nozzle cap 82.

In one non-limiting embodiment, during a liquid fuel operating mode of the engine, centrally-located atomizer 80 is coupled to a first fluid circuit 86 (FIG. 12) conveying a liquid fuel to form an atomized cone of liquid fuel and the array of circumferentially disposed atomizers 84 is coupled to a second fluid circuit 88 conveying water to form an atomized array of water cones.

In one alternative embodiment, during a liquid fuel operating mode of the engine, centrally-located atomizer 80 is coupled to first fluid circuit 86, which in this alternative embodiment conveys water to form an atomized cone of water and the array of circumferentially disposed atomizers 84 is coupled to second fluid circuit 88, which in this alternative embodiment conveys liquid fuel to form an atomized array of liquid fuel cones.

Nozzle cap 82 further comprises a plurality of gas fuel channels 90 circumferentially disposed about longitudinal axis 18. The plurality of gas fuel channels 90 being positioned radially outwardly relative to array of atomizers 84.

In one non-limiting embodiment, during a gas fuel operating mode of the engine, the array of atomizers 84 is coupled to first fluid circuit 86 conveying water to form an atomized array of water cones. In one alternative embodiment, during a gas fuel operating mode of the engine, centrally-located atomizer 80 is coupled to second fluid circuit 88, which in this alternative embodiment conveys water to form an atomized cone of water.

Figure 13:
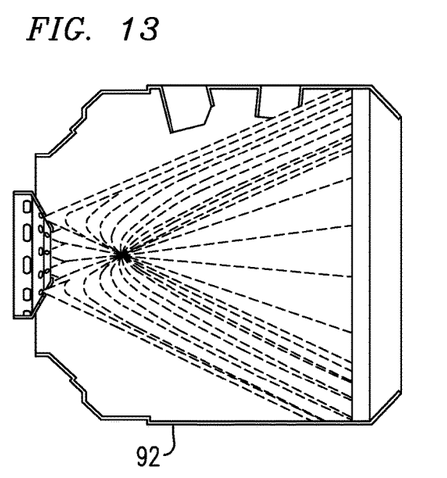
FIGS. 13 and 14 illustrate respective non-limiting embodiments comprising a different number of atomizers in the array and a different angular spread in the ejections cones formed with such atomizer arrays.
Figure 14:
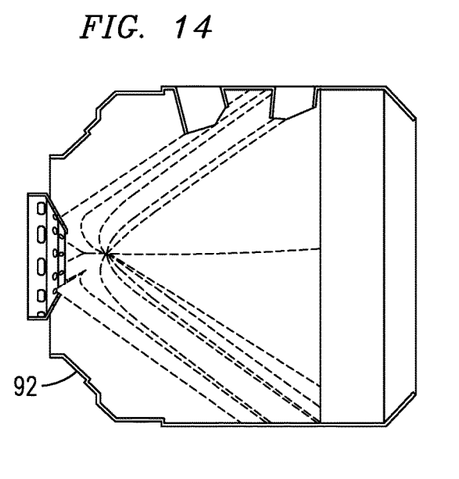

As may be conceptually appreciated in FIGS. 13 and 14, the numbers of atomizers in the array and/or an angular spread of the respective second atomized ejection cones may be arranged to target a desired zone in a combustor basket 92. FIG. 13 illustrates a non-limiting embodiment where the number of atomizers in the array is 12 and the angular spread of each cone is approximately 50 degrees. FIG. 14 illustrates a non-limiting embodiment where the number of atomizers in the array is 6 and the angular spread of each cone is approximately 70 degrees.

In one non-limiting embodiment, the array of atomizers 84 may be affixed to nozzle cap 82 by way of respective threaded connections 94 (FIG. 11). This facilitates removal and replacement of respective atomizers in the array of atomizers. In one optional embodiment, the number of atomizers in the array 84 may involve removing at least some of the atomizers and plugging with respective suitable plugs 94 (FIG. 10 shows one example plugged outlet) the outlets previously occupied by the removed atomizers.

In operation, aspects of the disclosed multi-functional fuel nozzle effectively allow meeting NOx target levels within an appropriate margin, and further allow practically eliminating water impingement on the liner walls of a combustor basket and this is conducive to improving liner durability and appropriately meeting predefined service intervals in connection with these components of the turbine engine.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A multi-functional fuel nozzle for a combustion turbine engine, comprising:
   an annular fuel-injecting lance comprising a first fluid circuit and a second fluid circuit,
   wherein the first fluid circuit is centrally disposed within the lance, wherein the first fluid circuit extends along a longitudinal axis of the lance to convey a first fluid to a downstream end of the lance,
   wherein the second fluid circuit is annularly disposed about the first fluid circuit to convey a second fluid to the downstream end of the lance, wherein one of the first and second fluids comprises a liquid fuel conveyed by one of the first and second fluid circuits during a liquid fuel operating mode of the combustion turbine engine,
   wherein the other of the first and second fluids conveyed by the other of the first and second fluid circuits comprises a selectable non-fuel fluid; and
   an atomizer disposed at the downstream end of the lance, the atomizer having a first ejection orifice responsive to the first fluid circuit to form a first atomized ejection cone, the atomizer further having a second ejection orifice responsive to the second fluid circuit to form a second atomized ejection cone, wherein the first and second ejection orifices of the atomizer are respectively configured so that the first and second ejection cones formed with the atomizer comprise concentric cones that intersect with one another over an angular range of intersection; and
   a plurality of gas fuel channels circumferentially disposed about the longitudinal axis of the lance, the plurality of gas fuel channels being positioned circumferentially outwardly relative to the annular lance, wherein, during a gas fuel operating mode of the engine, the selectable non-fuel fluid comprises water, which is conveyed by at least one of the first and second fluid circuits, and wherein at least one of the first and second ejection cones comprises a respective cone formed of atomized water, wherein relatively larger intersecting angular differences between the first and second atomized ejection cones are conducive to enhanced atomization during an ignition event of the liquid fuel and relatively smaller intersecting angular differences between the first and second atomized ejection cones are conducive to enhanced NOx abatement during gas fuel operation.

2. The multi-functional fuel nozzle of claim 1, wherein in the liquid fuel operating mode of the combustion turbine engine, the first atomized ejection cone comprises one of the liquid fuel or the selectable non-fuel fluid, and the second atomized ejection cone comprises the other of the liquid fuel or the selectable non-fuel fluid.

3. The multi-functional fuel nozzle of claim 1, wherein, during the ignition event of the liquid fuel, the selectable non-fuel fluid comprises air, which is conveyed by the first fluid circuit, and the first atomized ejection cone comprises a cone of air, and the liquid fuel comprises an oil fuel, which is conveyed by the second fluid circuit, and the second atomized ejection cone comprises a cone of atomized oil fuel, and further wherein, subsequent to the ignition event of the liquid fuel, the selectable non-fuel fluid comprises water, which is conveyed by the first fluid circuit, and the first atomized ejection cone comprises a cone of atomized water.

4. The multi-functional fuel nozzle of claim 1, wherein, during the ignition event of the liquid fuel, the liquid fuel comprises an oil fuel, which is conveyed by the first circuit, and the first atomized ejection cone comprises a cone of atomized oil fuel, and the selectable non-fuel fluid comprises air, which is conveyed by the second circuit, and the second atomized ejection cone comprises a cone of air, and further wherein, subsequent to the ignition event of the liquid fuel, the selectable non-fuel fluid comprises water, which is conveyed by the second fluid circuit, and the second atomized ejection cone comprises a cone formed of atomized water, which is mixed with the cone of atomized oil fuel.

5. The multi-functional fuel nozzle of claim 4, wherein, during the gas fuel operating mode of the engine, the selectable non-fuel fluid comprises water, which is conveyed by at least one of the first and second fluid circuits, and wherein at least one of the first and second ejection cones comprises a respective cone formed of atomized water.

6. The multi-functional fuel nozzle of claim 1, wherein, during the gas fuel operating mode of the engine, at least some of the plurality of gas fuel channels convey water mixed with fuel gas.

7. The multi-functional fuel nozzle of claim 1, wherein, during the gas fuel operating mode of the engine, at least some of the plurality of gas fuel channels convey water mixed with fuel gas.

8. The multi-functional fuel nozzle of claim 1, wherein an angular range of the first atomized ejection cone extends from approximately 80 degrees to approximately 120 degrees.

9. The multi-functional fuel nozzle of claim 8, wherein an angular range of the first atomized ejection cone extends from approximately 90 degrees to approximately 115 degrees.

10. The multi-functional fuel nozzle of claim 9, wherein an angular range of the first atomized ejection cone extends from approximately 104 degrees to approximately 110 degrees.

11. The multi-functional fuel nozzle of claim 1, wherein an angular range of the second atomized ejection cone extends from approximately 40 degrees to approximately 90 degrees.

12. The multi-functional fuel nozzle of claim 11, wherein an angular range of the second atomized ejection cone extends from approximately 60 degrees to approximately 80 degrees.

13. A method regarding a multi-functional fuel nozzle for a combustion turbine engine, the method comprising:
centrally disposing a first fluid circuit within an annular fuel-injecting lance, wherein the first fluid circuit extends along a longitudinal axis of the lance to convey a first fluid to a downstream end of the lance;
annularly disposing a second fluid circuit about the first fluid circuit to convey a second fluid to the downstream end of the lance;
circumferentially disposing about the longitudinal axis of the lance a plurality of gas fuel channels, and positioning the plurality of gas fuel channels circumferentially outwardly relative to the annular lance;
during a liquid fuel operating mode of the engine, one of the first and second fluids comprising a liquid fuel, conveying the liquid fuel with one of the first and second fluid circuits;
the other of the first and second fluids comprising a selectable non-fuel fluid, conveying the selectable non-fuel fluid with the other of the first and second circuits;
disposing a dual orifice atomizer at the downstream end of the lance;
coupling the dual orifice atomizer to the first fluid circuit to form a first atomized ejection cone and to the second fluid circuit to form a second atomized ejection cone; and
arranging the first and the second ejection cones to intersect with one another over an intersecting angular range, wherein relatively larger intersecting angular differences between the first and second atomized ejection cones are conducive to enhanced atomization during an ignition event of the liquid fuel and relatively smaller intersecting angular differences between the first and second atomized ejection cones are conducive to enhanced NOx abatement during gas fuel operation.

14. The method of claim 13, further comprising defining an angular range of the first ejection cone to extend from approximately 80 degrees to approximately 120 degrees.

15. The method of claim 14, wherein the angular range of the first atomized cone extends from approximately 90 degrees to approximately 115 degrees.

16. The method of claim 15, wherein the angular range of the first atomized cone extends from approximately 104 degrees to approximately 110 degrees.

17. The method of claim 1, further comprising defining an angular range of the second atomized cone to extend from approximately 40 degrees to approximately 90 degrees.

18. The method of claim 17, wherein the angular range of the second atomized cone extends from approximately 60 degrees to approximately 80 degrees.

* * * * *